United States Patent [19]

Mon

[11] 4,241,760
[45] Dec. 30, 1980

[54] FLUIDIC VALVE
[75] Inventor: George Mon, Silver Spring, Md.
[73] Assignee: The United States of America as represented by the Secretary of the Army, Washington, D.C.
[21] Appl. No.: 8,627
[22] Filed: Feb. 1, 1979
[51] Int. Cl.³ .............................................. F15C 3/00
[52] U.S. Cl. ................................................. 137/829
[58] Field of Search ............... 137/829, 830, 831, 832, 137/875, 826

[56] References Cited
U.S. PATENT DOCUMENTS

| | | | |
|---|---|---|---|
| 1,905,733 | 4/1933 | Moore | 137/101 |
| 2,777,251 | 1/1957 | Bailey | 137/875 X |
| 3,053,276 | 9/1962 | Woodward . | |
| 3,342,198 | 9/1967 | Groeber | 137/829 |
| 3,457,933 | 7/1969 | Craft . | |
| 3,509,775 | 5/1970 | Evans | 137/829 X |
| 3,556,119 | 1/1971 | Ankeney . | |
| 3,605,780 | 9/1971 | Kranz . | |
| 3,612,103 | 10/1971 | Waddington . | |
| 3,771,567 | 11/1973 | Linden . | |
| 3,773,062 | 11/1973 | McIver | 137/875 X |
| 3,993,101 | 11/1976 | Tippetts et al. | 137/831 |
| 4,073,316 | 2/1978 | Nystrom | 137/829 |

Primary Examiner—William R. Cline
Attorney, Agent, or Firm—Nathan Edelberg; Robert P. Gibson; Saul Elbaum

[57] ABSTRACT

A fluidic valve which includes a supply nozzle for discharging a fluid power stream, and a pair of outlet channels for receiving the power stream. A rigid member is disposed inside the power nozzle so that it splits the power stream evenly and fluid exits via the two outlet channels with equal pressures. A shaft upon which the rigid member is mounted is responsive to an external input signal for causing the rigid member to turn so that fluid exits via the two outlet channels with a proportional pressure differential output signal being produced across the outlet channels. A centering spring returns the rigid member to its null position when no external input signal is applied to the shaft.

6 Claims, 1 Drawing Figure

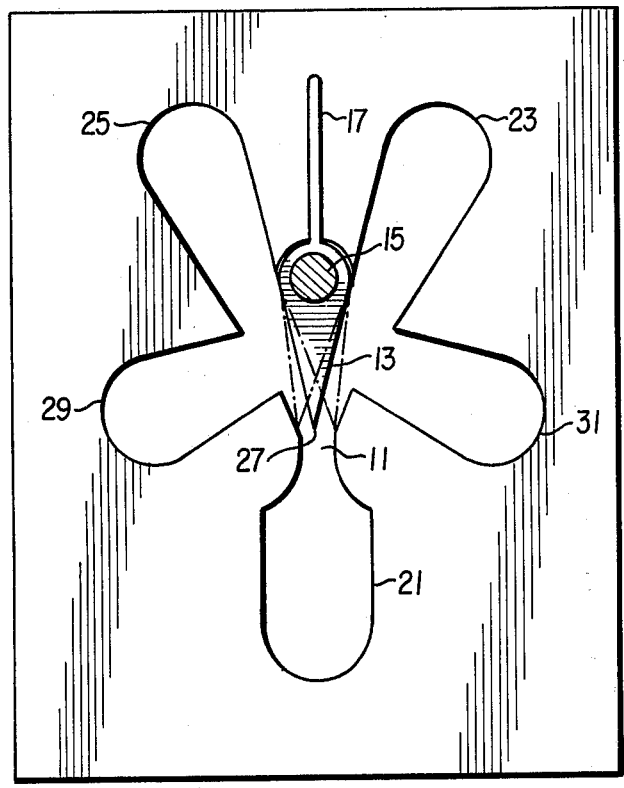

FLUIDIC VALVE

RIGHTS OF THE GOVERNMENT OF THE UNITED STATES

The invention described herein may be manufactured, used and licensed by or for the U.S. Government for governmental purposes without the payment to me of any royalty thereon.

BACKGROUND OF THE INVENTION

The present invention relates generally to fluid control devices, and more particularly to a directable free jetstream type valve.

Fluidic valves are well known for providing control functions for moving fluid streams. One type of fluidic valve currently in use is disclosed in U.S. Pat. No. 3,612,103 in the name of M. B. Waddington and issued July 1, 1969. This device is a deflector jet servovalve which has an electromagnetic torque motor and two stages of hydraulic power amplification. Two permanent magnets are arranged in parallel between the upper and lower polepieces of the torque motor. The motor armature extends into the two air gaps located between these polepieces. A flexure tube supports the armature for rocking motion caused by magnetic forces developed at the air gaps. The flexure tube also seals the torque motor cavity from hydraulic fluid. The first stage of the deflector jet servovalve is a disc defining a fluidic amplifier containing a fixed pressure jet and two receivers. The fluidic disc is contained between cylindrical end covers which provide the top and bottom walls for the fluid amplifier. A jet stream deflector is located in the return pressure chamber between the pressure and receiver openings. The deflector contains a V-shaped slot that straddles the jet. At the upper end the deflector member attaches rigidly to the mid-point of the armature so that armature motion moves the jet deflector from side to side. The differential flow or pressure developed between the receivers is applied to the ends of a second-stage spool.

The design of the first-stage of the servovalve is complex and it is not capable of high frequency response and passive recovery.

SUMMARY OF THE INVENTION

Accordingly, one object of the present invention is to provide an improved fluidic valve.

Another object of the present invention is to provide such a valve which has a simple design.

It is yet another object of the present invention to provide such a valve which exhibits a high frequency response and passive recovery.

It is yet a further object of the present invention to provide such a valve which can be used as a displacement transducer.

Briefly in accordance with the invention, a fluidic valve is provided which includes a supply nozzle for discharging a fluid power stream; a pair of outlet channels for receiving the power stream; a rigid member disposed inside the power nozzle so that it splits the power stream evenly and fluid exits via the two outlet channels with equal pressures; and an input shaft responsive to an external input signal for causing the rigid member to turn so that fluid exits via the two outlet channels with a proportional pressure differential output signal being produced across the outlet channels. A centering spring returns the rigid member to its null position when no external signal is applied to the shaft. An advantage of the valve design is that the input shaft can be easily sealed with an "O" ring and it does not require a flexible seal as in almost all prior art fluidic valves.

The foregoing as well as other objects, features, and advantages of the present invention will become more apparent from the following detailed description taken in conjunction with the appended drawing.

BRIEF DESCRIPTION OF THE DRAWING

The FIGURE is a plan view of the fluidic valve in accordance with the invention.

DESCRIPTION OF PREFERRED EMBODIMENT

Referring to the FIGURE, there is shown a fluidic valve in accordance with the invention. Chamber 11 is provided to house rigid splitter member 13. Splitter 13 is mounted on input shaft 15 and is capable of turning in response to rotation of shaft 15 (through means not shown, but which are well known in the art, such as the torque motor seen in the above-cited Waddington patent). Splitter 13 may be turned from its null position either to the right or to the left depending upon the direction in which shaft 15 is rotated. When the rotating force is terminated, centering spring 17 will return the splitter 13 to its null position, as understood by those skilled in the art.

The input shaft 15 is aligned normal to the prime axis of a supply nozzle 21. The nozzle discharges a power stream of fluid into outlet channels 23 and 25. In the null position, splitter 13 is disposed so that it intercepts the power stream and splits it evenly to provide equal pressure in the outlet channels 23 and 25. Splitter 13 is tapered and its tip 27 is located inside the supply nozzle to isolate the outlet channels from each other. Outlet channels 23 and 25 are disposed as close as possible to the discharge orifice of the supply nozzle 21 so that the pressure recovery is very high. Any overspill is exhausted by vents 29 and 31.

Assuming now that input shaft 15 is rotated in a clockwise direction, splitter 13 will be turned to the left. This causes more of the power stream to be directed toward outlet channel 23 than the other outlet channel 25. As a consequence, a pressure differential between the outlet channels is established with the dominant pressure in the right outlet channel 23.

Assuming that input shaft 15 is rotated in a counterclockwise direction, splitter 13 will be turned to the right and it will be seen that more of the power stream is directed to flow into outlet channel 25 than into outlet channel 23. As a consequence a pressure differential between the outlet channels is established with the dominant pressure in the left outlet channel 25.

The valve is proportional in that any signal applied to input shaft 15 will cause the splitter 13 to move in such a way that a proportional pressure differential output signal is produced at the outlet channels. Because the output signal is proportional to the splitter displacement, the valve can be used as a displacement transducer.

I wish it to be understood that I do not desire to be limited to the exact details of construction shown and described, for obvious modifications can be made by a person skilled in the art.

What is claimed as new and desired to be secured by Letters Patent of the United States is:

1. A fluidic flow diverter comprising:
   a substantially rigid body;
   a supply nozzle for discharging a fluid power stream formed in said body;
   a pair of outlet channels formed in said body for receiving the power stream
   a pinstably mounted tapered rigid control member disposed inside the power nozzle in a first position so that it splits the power stream evenly and fluid exists via the two outlet channels with equal pressures;
   a plurality of vents for exhausting fluid overspill from the outlet channels disposed between the supply nozzle and the outlet channels, and
   turning means responsive to an external input signal for causing the rigid control member to be displaced from said first position so that fluid exits via the two outlet channels with a pressure differential proportional to the displacement of said member being produced across the outlet channels.

2. The fluidic flow diverter recited in claim 1 wherein:
   the turning means is a shaft upon which the rigid control member is mounted.

3. The fluidic flow diverter recited in claim 2 wherein:
   the shaft is aligned normal to the prime axis of the supply nozzle.

4. The fluidic flow diverter recited in claim 1 including:
   means for returning the rigid control member to its first position when no external input signal is applied to the turning means.

5. The fluidic flow diverter recited in claim 4 wherein:
   the returning means is a centering spring.

6. The fluidic flow diverter recited in claim 1 wherein:
   the rigid control member has a tip being disposed inside the power nozzle.

* * * * *